(12) United States Patent
Park et al.

(10) Patent No.: US 9,996,199 B2
(45) Date of Patent: Jun. 12, 2018

(54) FILM HAPTIC SYSTEM HAVING MULTIPLE OPERATION POINTS

(71) Applicant: Electronics and Telecommunications Research Institute, Daejeon (KR)

(72) Inventors: Suntak Park, Daejeon (KR); Ki-Uk Kyung, Daejeon (KR); Sung Ryul Yun, Daejeon (KR); Young Sung Kim, Daejeon (KR); Jong-uk Lee, Andong-si (KR); Bong Je Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 496 days.

(21) Appl. No.: 13/866,750

(22) Filed: Apr. 19, 2013

(65) Prior Publication Data

US 2014/0015777 A1    Jan. 16, 2014

(30) Foreign Application Priority Data

Jul. 10, 2012 (KR) .................. 10-2012-0075184
Dec. 3, 2012 (KR) .................. 10-2012-0139103

(51) Int. Cl.
*G06F 3/01* (2006.01)
*G06F 3/048* (2013.01)
(Continued)

(52) U.S. Cl.
CPC .............. *G06F 3/044* (2013.01); *G06F 3/016* (2013.01); *G06F 3/04886* (2013.01)

(58) Field of Classification Search
CPC ................ G02B 26/0841; G06F 3/016; H01H 2003/008; H01L 41/042; H01L 41/293; F16F 15/005; Y10T 29/42; H04R 17/00
(Continued)

(56) References Cited

U.S. PATENT DOCUMENTS

2005/0114041 A1* 5/2005 Gawad ............... G01N 15/1227
702/29
2007/0007861 A1* 1/2007 Jaworski ................... B06B 3/02
310/338
(Continued)

FOREIGN PATENT DOCUMENTS

KR    10-2010-0015259 A    2/2010
KR    10-2010-0074819 A    7/2010
(Continued)

*Primary Examiner* — Lin Li

(57) ABSTRACT

Provided is a thin film type actuator having multi-operation points, capable of various feels of touch or sounds. The film type actuator includes an upper plate and a lower plate, formed of a single plate. Between the upper plate and the lower plate, pairs of electrode parts capable of attracting one another via an electrostatic force. Since each of the pairs of electrode parts functions as an operation point and the upper plate and the lower plate are formed of the single plate, movements of the respective operation points in such a way that a new physical movement different from an original individual movement is generated to generate a haptic feel or a sound. It is possible to generate various haptic feels or sounds by modulating and combining amplitudes and frequencies of the respective operation points.

17 Claims, 6 Drawing Sheets

(51) Int. Cl.
- *B01L 3/02* (2006.01)
- *B01L 3/00* (2006.01)
- *B81C 1/00* (2006.01)
- *G01L 1/14* (2006.01)
- *B06B 1/06* (2006.01)
- *G01G 19/41* (2006.01)
- *H04R 17/00* (2006.01)
- *G06F 3/044* (2006.01)
- *G06F 3/0488* (2013.01)

(58) Field of Classification Search
USPC ......... 257/417; 310/300, 363, 367; 318/599; 345/156, 501; 359/290, 578; 365/185.18; 435/6.11; 438/753; 73/718; 349/143
See application file for complete search history.

(56) References Cited

U.S. PATENT DOCUMENTS

| | | | |
|---|---|---|---|
| 2009/0013802 A1* | 1/2009 | Orlewski | G01G 19/4142 73/862.046 |
| 2009/0322496 A1* | 12/2009 | da Costa | G06F 3/016 340/407.2 |
| 2010/0013352 A1* | 1/2010 | Pletner | F16F 15/005 310/316.01 |
| 2010/0107770 A1* | 5/2010 | Serban | G01L 1/142 73/718 |
| 2010/0156845 A1 | 6/2010 | Kim et al. | |
| 2010/0171715 A1 | 7/2010 | Peterson et al. | |
| 2010/0194243 A1* | 8/2010 | Yoneyama | B06B 1/0696 310/338 |
| 2010/0236929 A1* | 9/2010 | Pollack | B01L 3/50273 204/450 |
| 2010/0307917 A1* | 12/2010 | Srinivasan | B01L 3/0268 204/450 |
| 2011/0121691 A1* | 5/2011 | Ikushima et al. | 310/367 |
| 2011/0221300 A1* | 9/2011 | Shimanouchi | B81C 1/00698 310/300 |
| 2011/0222157 A1* | 9/2011 | Sano | G01J 3/26 359/578 |
| 2011/0298758 A1* | 12/2011 | Hsieh | G06F 3/016 345/177 |
| 2012/0086651 A1* | 4/2012 | Kwon | G06F 3/016 345/173 |
| 2012/0127136 A1* | 5/2012 | Schneider | G02F 1/13718 345/204 |
| 2012/0306790 A1* | 12/2012 | Kyung | G06F 3/016 345/173 |
| 2013/0130261 A1* | 5/2013 | Prodromakis et al. | 435/6.11 |
| 2013/0207793 A1* | 8/2013 | Weaber | G06F 1/1601 340/407.2 |
| 2013/0293246 A1* | 11/2013 | Pollack | B01L 3/502784 324/671 |
| 2013/0307789 A1* | 11/2013 | Karamath | G06F 3/016 345/173 |
| 2013/0328191 A1* | 12/2013 | Meyer | H01L 23/5329 257/738 |
| 2013/0328821 A1* | 12/2013 | Bulea | 345/174 |
| 2014/0015617 A1* | 1/2014 | Onishi | H04R 17/00 331/154 |

FOREIGN PATENT DOCUMENTS

| | | | |
|---|---|---|---|
| KR | 10-2011-0110296 A | 10/2011 | |
| WO | WO 2012/017424 | * 2/2012 | ............ G01N 27/60 |

* cited by examiner

FILM HAPTIC SYSTEM HAVING MULTIPLE OPERATION POINTS

CROSS-REFERENCE TO RELATED APPLICATIONS

This U.S. non-provisional patent application claims priority under 35 U.S.C. § 119 of Korean Patent Application Nos. 10-2012-0075184, filed on Jul. 10, 2012, and 10-2012-0139103, filed on Dec. 3, 2012, the entire contents of which are hereby incorporated by reference.

BACKGROUND OF THE INVENTION

The present invention disclosed herein relates to a device for transferring feels of touch, and more particularly, to a thin film haptic transfer device having multiple operation points and generating various touches or sounds.

Currently released terminals manufactured in various forms such as mobile phones, navigations, digital information displays (DIDs), and tablets basically provide touch interfaces. Connected with a touch interface, as a method of increasing a user experience, recently haptic technology providing a feel of touch has stood out. When a user interacts with a digital object, various forms of the feel of touch are provided in such a way that a feedback formed by blending senses of vision and touch, thereby providing a realistic user interface.

As a typical method of providing a feel of touch, motor systems are most general. Motor systems have been variously applied to mobile devices due to a quick response speed, low power consumption, and easiness of controlling the output of a feel of touch. However, when providing the feel of touch by using motor systems, due to a size of a haptic module, it is difficult to arrange modules and an own thickness of a device becomes greater. Particularly, as typical technology of using a motor system, a structure propagates a vibration to the entire device. Accordingly, since it is difficult to provide a localized haptic sense only to a spot in contact with a hand of a user, it is difficult to be applied to navigations, digital information displays (DIDs), and monitors, which are not portable electronic devices.

To overcome these limitations, recently, film type haptic modules capable of being mounted on display panels have been provided. Film type haptic modules are classified into a case of using a deformation of a material itself by using electroactive polymers and a case of using electrostatic force. In the case of using electroactive polymers, according to properties of polymers, it is possible to realize haptic modules provided as a film type with low power consumption and a quick response speed. In this case, since it is difficult to output enough only using the deformation of polymers, a mass with a certain weight may be used. The deformation of electroactive polymers drives the additional device, and the user receives a feel of touch due to the driving of the additional device. Accordingly, in this case, to output enough, electroactive polymer layers and the additional device are needed.

On the other hand, Korean Patent Application No. 2011-7018443 (hereinafter, referred to as Cited Reference) discloses one of traditional methods of using electrostatic force. In case of Cited Reference, two substrates coated with a conductive material are disposed and charged via the same or different conductive material, respectively. Also, instant attractive and repulsive forces generated by an electrostatic force therebetween generate a feel of touch. As described above, an actuator formed of such two substrates is independently formed on one of a top and a bottom of a touch panel. In real application, an insulating layer inserted into two substrates to prevent a current flow may be additionally necessary.

However, in a traditional technology including Cited Reference, since the entire device vibrates or the entire one substrate vibrates, only the same feel of touch may be felt at all points of the substrate. Accordingly, when using traditional arts, although two or more touch points exist, it is very difficult to embody different haptic feedbacks that are multi-feels of touch or an active haptic feedback, for example, a feeling like water flows without movement of a hand while touching.

SUMMARY OF THE INVENTION

The present invention provides a transparent film type haptic transfer device and a method of using the same, the device capable of transferring different button-senses or various haptic feedbacks when a user touches a button or a display panel with two or more contact points on.

The present invention also provides a touch sensation/sound transfer device capable of generating not only various feels of touch but also sounds.

Embodiments of the present invention provide actuators including at least two or more first plate electrode parts disposed on a first plate in a first direction to be separate from one another, and at least two or more second plate electrode parts disposed on a second plate separate from the first plate in a second direction, facing the first plate electrode parts corresponding to the first plate electrode parts, respectively, to form pairs of electrode parts. The pairs of electrode parts facing one another independently perform physical movements when an electric signal is inputted.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
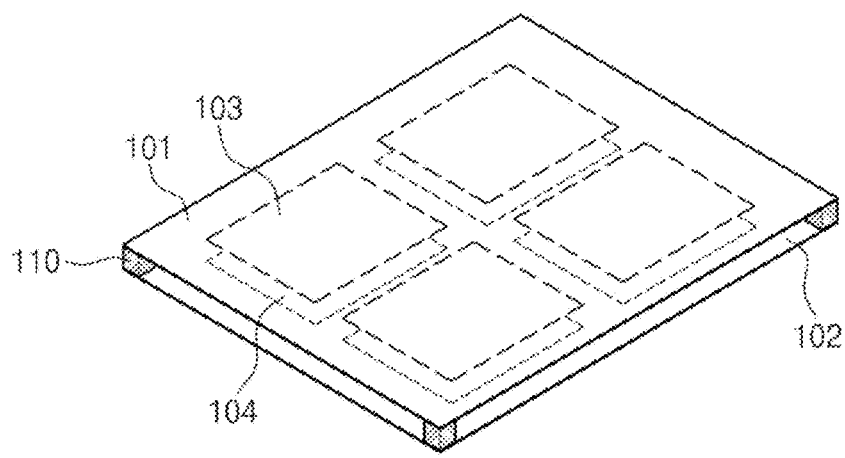
FIG. 1 is a configuration view illustrating a film type actuator having multi-operation points according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Also, other devices, material layers, and circuit blocks may be further included.

It should be noted that respective exemplary embodiments described below may include complementary embodiments and a detailed description of switching operations related haptic generation and an inner function circuit will not be described not to make the subject matters of the present invention obscure.

The present invention provides a thin-film actuator-based touch sensation/sound generation device and a method of controlling the same, the device capable of generating not only various active haptic feedbacks but also sounds when a user interacts with an object outputted on a touch type display by using a finger.

To provide the device and method as described above, the touch sensation/sound generation device includes two or more actuators capable of simultaneously transferring a feel of touch, that is, a vibration to one substrate. The actuators may be transparent film type actuators, which may be easily mounted on a display device with a touch screen such as a mobile phone. When including two or more actuators as the touch sensation/sound generation device, since a feel of touch may be transferred to a user by using a reiteration of vibrations generated by the respective actuators, it is possible to provide various haptic feedbacks that cannot be transferred by using only one actuator.

It may be understood using an interfere phenomenon between two waves when two vibrations are reiterated.

For example, a composite wave of two waves $\sin(2\pi f_1 t)$ and $\sin(2\pi f_2 t)$ having the same amplitude (x) and frequencies $f_1$ and $f_2$ at a certain location is as follows.

$$\sin(2\pi f_1 t) + \sin(2\pi f_2 t) = 2\cos\left(2\pi \frac{f_1 - f_2}{2} t\right) \sin\left(2\pi \frac{f_1 + f_2}{2} t\right) \quad \text{Equation (1)}$$

When phases of the two waves are identical to each other according to Equation 1, that is, when a constructive interference occurs, amplitude becomes two times of amplitudes of the respective waves. This makes it possible to transfer a touch sensation of two times of the maximum value of a vibration that can be generated by one actuator.

Also, when the frequencies $f_1$ and $f_2$ are similar, a composite wave gets to have a term having an intermediate value of the frequencies $f_1$ and $f_2$ of the two waves as a dominant wave component in such a way that a term having a relatively slow period acts as a term of modulating amplitude and a composite wave having a new vibration number is formed, which is designated as a beat phenomenon. This allows transferring a touch sensation having the number of vibrations that are generated not by the actuator.

As described above, when using a plurality of actuators, it is possible to transfer various touch sensations that cannot be transferred by only one actuator by using the constructive interference or the beat phenomenon. Also, in the case of the film type actuator, since there is formed a configuration capable of generating sounds, it is possible to embody various sounds as described above.

Based on the described above, hereinafter, with reference to the attached drawings, there will be described in detail a touch sensation/sound generation device and a method of driving the same according to an embodiment of the present invention.

FIG. 1 is a configuration view illustrating a film type actuator having multi-operation points according to an embodiment of the present invention.

As shown in FIG. 1, the film type actuator having multi-operation points includes an upper plate 101, a lower plate 102, a plurality of upper plate electrode parts 103 disposed on a bottom of the upper plate 101, and a plurality of lower plate electrode parts 104 disposed on a top of the lower plate 102, facing the plurality of upper plate electrode parts 103 and forming pairs with the plurality of upper plate electrode parts 103.

The upper plate 101 as a first plate is formed in one thin-film shape and has a considerable level of strength. Generally, the upper plate 101 may be formed of a material having 1 GPa or more of Young's modulus.

The lower plate 102 as a second plate may be formed of a thin film thicker than the upper plate 101 or formed by using a material having higher strength than the upper plate 101. When the strength of the lower plate 102 is not enough, it is possible to use a configuration of increasing the strength of the lower plate 102 by attaching a material having high strength to a bottom of the lower plate 102.

The plurality of upper plate electrode parts 103 as first plate electrode parts may be thinly applied or attached to a bottom surface of the upper plate 101 by using a conductive material.

The plurality of lower plate electrode parts 104 as second plate electrode parts may be thinly applied or attached to a top surface of the lower plate 102 by using a conductive material to face the upper plate electrode parts 103.

The first and second plate electrode parts may be formed of a material stronger and solider than the first and second plates.

To prevent a short-circuit phenomenon of electrodes, on one or more of the upper plate electrode parts 103 and the lower plate electrode parts 104, a coating layer formed of an insulating material may be formed.

In the present embodiment, the plurality of upper plate electrode parts 103 and the plurality of lower plate electrode parts 104 form pairs of electrodes facing one another and disposed separately on the upper plate 101 and the lower plate 102. That is, one of the plurality of upper plate electrode parts 103 and a corresponding one of the plurality of lower plate electrode parts 104 form together one pair of electrodes and are disposed to face each other. In this case, since the one pair of electrodes forms one operation point, a plurality of the pairs of electrodes forms multi-operation points.

On an edge part between the upper plate 101 and the lower plate 102, a spacer 110 is installed and forms a space for prevent the upper plate electrode parts 103 and the lower plate electrode parts 104 from being in contact with one another. That is, the spacer 110 forms a support structure to support the upper plate 101 and the lower plate 102 to be parallel to each other.

To give a function of allowing the film type actuator of FIG. 1 to be transparent, the upper plate 101 and the lower plate 102 may be manufactured by using one of glass and a material having high light transmittance and a electrode material forming the upper plate electrode parts 103 and the lower plate electrode parts 104 may be also formed of a transparent electrode material.

Figure 2:
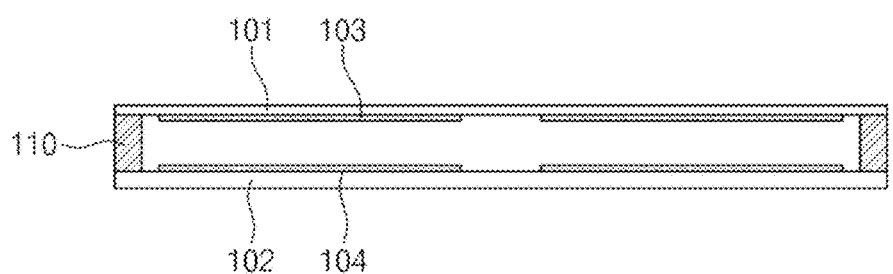
FIG. 2 is a side cross-sectional view illustrating the film type actuator of FIG. 1.

FIG. 2 is a side cross-sectional view illustrating the film type actuator of FIG. 1.

As shown in FIG. 2, the plurality of upper plate electrode parts 103 is disposed on the bottom of the upper plate 101, and the plurality of lower plate electrode parts 104 is disposed on the top of the lower plate 102. The upper plate electrode parts 103 and the lower plate electrode parts 104 disposed corresponding to one another to face one another form pairs of electrodes parts, which are formed as the number of the upper plate electrode parts 103 or the lower plate electrode parts 104. That is, when the number of the lower plate electrode parts 104 is four, the pairs of electrode parts are four. Also, each pair of the respective pairs of electrode parts is electrically insulated from one another. To prevent the upper plate electrode parts 103 and the lower plate electrode parts 104 from being in electric contact with one another, the spacer 110 may be disposed on a part of the edge. The spacer 110 may be formed of one of a soft polymer and a material having elasticity such as rubber. Also, to prevent the upper plate electrode parts 103 and the lower plate electrode parts 104 from being in electric contact with one another, a surfaces of one of the plurality of upper plate electrode parts 103 and the plurality of lower plate electrode parts 104 may be coated with an insulating film.

Figure 3:
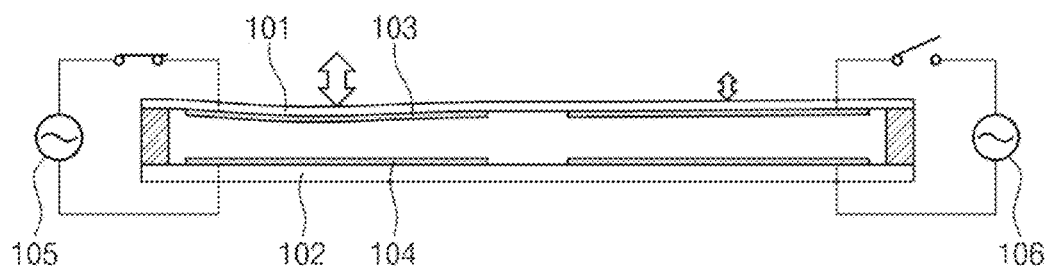
FIG. 3 is a view illustrating an operation of the film type actuator of FIG. 1.

FIG. 3 is a view illustrating operation of the film type actuator of FIG. 1.

As shown in FIG. 3, an electrode is connected between the upper plate electrode part 103 and the lower plate electrode part 104 forming one pair of the pairs of the upper plate electrode parts 103 and the lower plate electrode parts 104. After connecting the electrode, when supplying a current by using a power supply unit 105, since different electrodes are connected to the upper plate electrode part 103 and the lower plate electrode part 104, respectively, the upper plate 101 and the lower plate 102 are charged with different polarities, respectively. For example, when an anode is connected to the upper plate electrode part 103, the upper plate electrode part 103 is charged with positive charges, and when a cathode is connected to the lower plate electrode part 104, the lower plate electrode part 104 is charged with negative charges. Accordingly, different electrodes are formed on the respective plates facing each other.

In this case, an electrostatic force of being pulled by other charges having a different polarity occurs between the respective electrode parts in such a way that the upper plate 101 and the lower plate 102 are attracted by each other. In this case, when the lower plate 102 is thicker, formed of a material having higher strength, or fastened to a solid material, it is possible to induce only a movement of the upper plate 101.

Since charged amounts of the upper plate electrode part 103 and the lower plate electrode part 104 vary with an electric signal supplied by the power supply unit 105, the electrostatic force acting between the pair of two electrode parts is changed into the same form. Since a movement state of the upper plate 101 may be changed according to a change of a current supplied from the power supply unit 105, various movements including vibrations may be generated. Also, since the material forming the upper plate 101 and the lower plate 102 has considerable strength, although a part where a pair of electrode parts is disposed, to which a current is supplied, is attracted (refer to the left side of FIG. 2), a part where a pair of electrode parts is disposed, to which a current is not supplied, is received smaller attraction (refer to the right side of FIG. 2).

In the present embodiment, a movement generated by an operation theory of the film type actuator may be applied to film type devices used to transfer haptic feels while a user is in contact with the film type devices by using a finger or generating a sound via a vibration.

Generally, a vibration having a frequency within a range from about 0 to about 300 Hz is generated for a haptic feedback, and a sound having a frequency within a range from about 20 to 20,000 Hz is generated for a speaker. It is possible to generate both a sound and a vibration to allow a touch sensation to be felt if necessary. Also, it is possible to generate a sound on a certain part and to generate a haptic output on another certain part if necessary. Particularly, when all the upper and lower plate 101 and 102 and the upper and lower plate electrode parts 103 and 104 forming the film type actuator are formed of transparent materials, the film type actuator may be used as a haptic feedback device coupled with a touch screen device or a transparent speaker.

Figure 4:
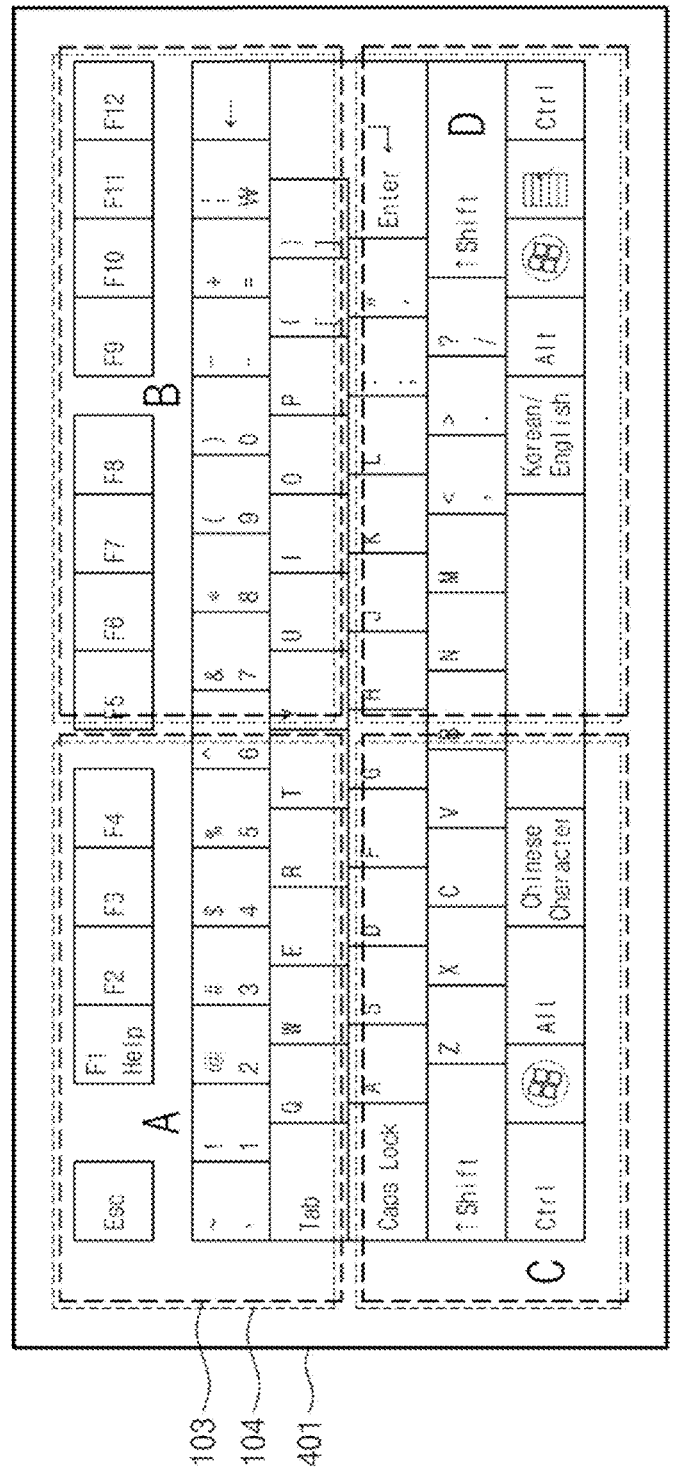
FIG. 4 is a concept view illustrating a method of linking the film type actuator of FIG. 1 with a keyboard-input.

FIG. 4 is a concept view illustrating a method of linking the film type actuator of FIG. 1 with a keyboard-input.

As shown in FIG. 4, a transparent film type actuator is disposed on a keyboard displayed on a touch screen 401 and four pairs of electrode parts may be disposed by using the upper plate electrode parts 103 and the lower plate electrode parts 104. When the pairs of electrode parts are disposed as shown in FIG. 4, a localized haptic feedback may be received when inputting via the keyboard. In this case, generally, since it is possible to manufacture a panel capable of recognizing a touch to be transparent and thin, the panel may be disposed on an uppermost top of the film type actuator.

When the film type actuator is manufactured to be transparent and the pairs of electrode parts are disposed as shown in FIG. 4, it may be minimized that two keys are operated at the same time in an area included by one pair. When an area of the keyboard is divided as shown in FIG. 4, although the left hand and the right hand touch the touch screen at the same time, it is possible to provide individual haptic feedback to the hands, respectively. A method of providing the individual haptic feedback may be embodied by generating the haptic output based on the electrostatic force, which can represent a feel of pushing a key in an area in contact with a finger as described with reference to FIG. 3. Also, when inputting special characters such as !, $, #, etc or hard consonants such as ㅃ, ㅉ, etc by using a SHIFT key, it is possible to provide haptic feedbacks to two fingers inputting at the same time, respectively.

By using the described above, it is possible not only to provide a localized key typing feel in an area of inputting a key to a keyboard user but to provide haptic feedbacks to fingers, respectively, when inputting by using several fingers at the same time.

Although it is ideal to dispose pairs of electrode parts with an area corresponding to all keys, when considering that an electrostatic force becomes smaller as the area is smaller, it may be possible to provide an enough area by dividing into four as in the present embodiment and simultaneously provide a localized haptic feedback while key-inputting.

Figure 5:
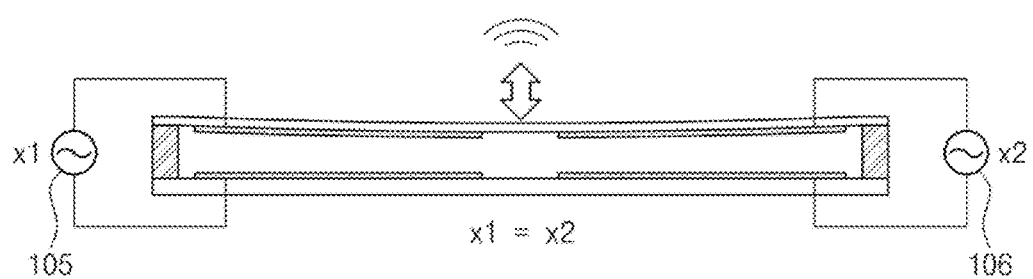
FIG. 5 is a concept view illustrating advantages when multi-operation points of the film type actuator of FIG. 1 generate the same output.

FIG. 5 is a concept view illustrating advantages when generating the same output by the multi-operation points of the film type actuator of FIG. 1.

As shown in FIG. 5, when power supply units 105 and 106 individually provided provide the same input signals to a pair of electrodes disposed individually, since each of the multi-operation points moves uniformly, respective outputs are overlapped, thereby increasing an output.

Accordingly, it is possible to output one of a haptic feedback and a sound greater than when individually operating.

Figure 6A:
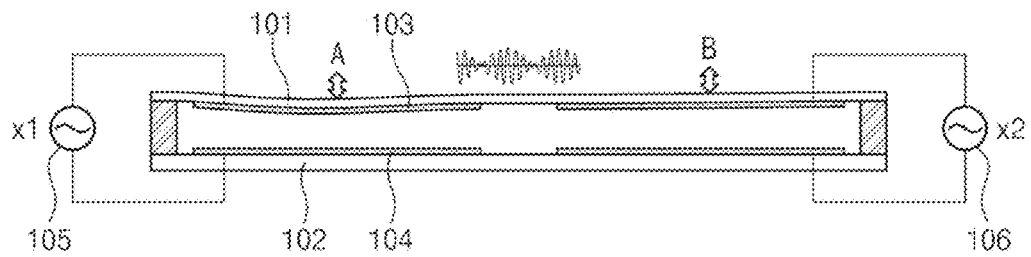
FIGS. 6A and 6B are concept views illustrating characteristics when the multi-operation points of the film type actuator of FIG. 1 generate different outputs, respectively.
Figure 6B:
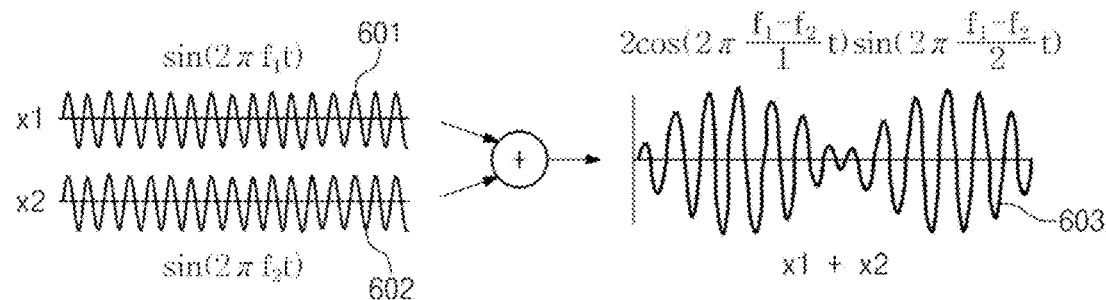

FIGS. 6A and 6B are concept views illustrating characteristics when generating different outputs by the multi-operation points of the film type actuator of FIG. 1.

As shown in FIG. 6A, when supplying individual electric signals to an operation point A that is a left side and an operation point B that is a right side formed by the pairs of electrodes parts, respectively, the operation points A and B individually operate. In this case, since the upper plate 101 is one plate having strength, operations of the operation points A and B are overlapped, thereby generating a new pattern on the upper plate 101.

For example, as shown in FIG. 6B, when a vibration 601 having a frequency $f_1$ is generated on the operation point A and a vibration 602 having a frequency $f_2$ is generated on the operation point B, two components are overlapped, thereby generating a new vibration 603 on the upper plate 101. In this case, when amplitudes of two inputted waveforms are the same, as shown in FIG. 6B, and a difference between the two frequencies $f_1$ and $f_2$ is very small, a vibration generated by the overlap shows new characteristic in which a shape of overlapped waveforms has a form of a low frequency as the difference between the frequencies $f_1$ and $f_2$ and amplitude is periodically changed. This phenomenon is designated as a beat phenomenon in physics.

The film type actuator according to the present embodiment having the multi-operation points has a configuration capable of easily generating the described the beat phenomenon. When using the beat phenomenon, it is possible to generate both an original operation frequency and a low frequency as a difference between two waveforms at the same time. When using this in touch sensation, it is possible to feel not only a vibration of the original operation frequency but a new low frequency change. When applying this to generate a sound, it is possible to generate not only an original high frequency sound but a very low frequency sound that may not be easily obtained. For example, when overlapping vibrations of 1,000 Hz and 1,010 Hz, a low frequency sound of 10 Hz that is difficult to be generally played may be generated.

The theory as described above has an advantage of obtaining an additional vibration effect in a new form by changing frequencies and amplitudes in the multi-operation points. The present embodiment allows all the effects to be realized via the configuration in which a plurality of the pairs of electrode parts is disposed on the upper plate 101 that is one and the lower plate 102.

Figure 7:
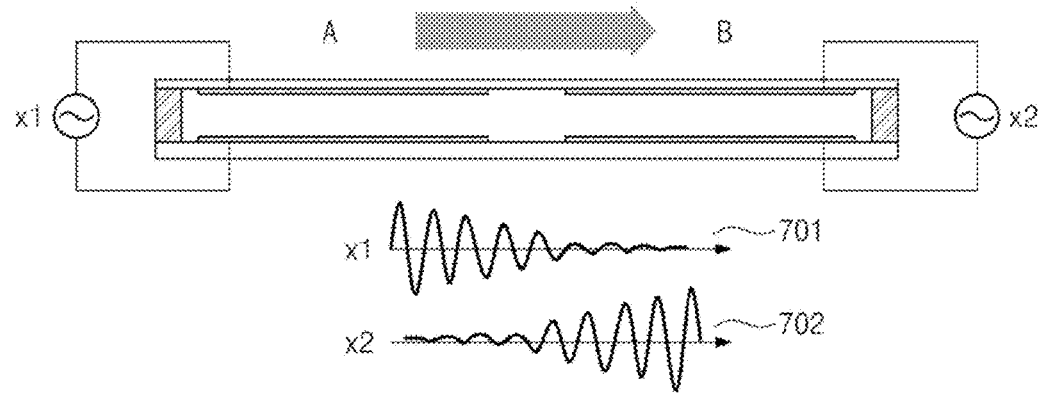
FIG. 7 is a concept view illustrating an exemplary method of embodying a flow of a vibration according to time in the film type actuator of FIG. 1.

FIG. 7 is a concept view illustrating a method of embodying a flow of a vibration according to time in the film type actuator of FIG. 1.

As shown in FIG. 7, in the case of the film type actuator including the respective operation points A and B, when a signal 701 becoming weaker according to time is supplied as an electric signal x1 supplied to the operation point A and a signal 702 becoming stronger according to time is supplied as an electric signal x2 supplied to the operation point B, as an arrow shown in the drawing, an effect of generating a feel of transferring a vibration generated in the operation point A to the operation point B may be obtained.

The film type actuator having the multi-operation points, despite a thin film shape thereof, has an effect of generating a feel like a vibration flows.

Figure 8:
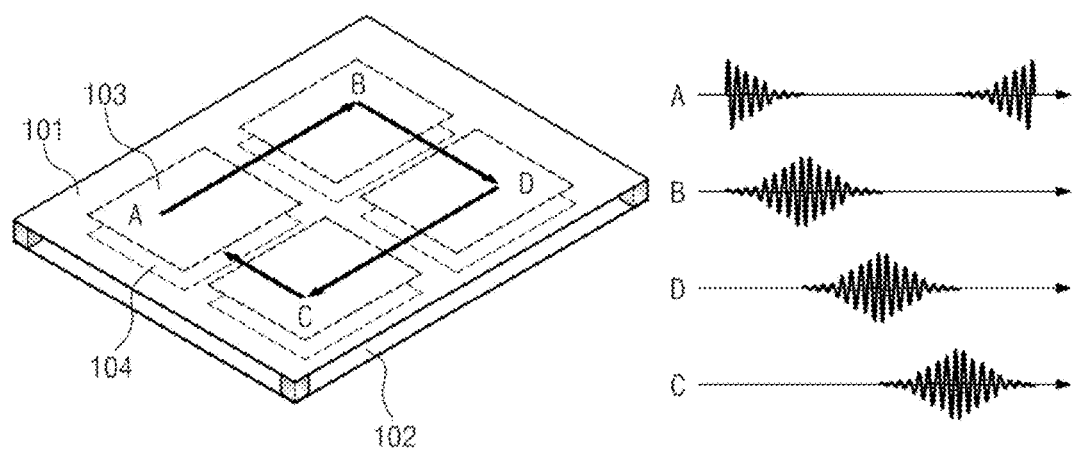
FIG. 8 is a concept view illustrating another exemplary method of embodying a flow of a vibration according to time in the film type actuator of FIG. 1.

FIG. 8 is a concept view illustrating another method of embodying a flow of a vibration according to time in the film type actuator of FIG. 1.

Referring to FIG. 8, the first plate 101 and the second plate 102 formed in thin film shapes installed separately from each other with a certain distance to be parallel to each other are disposed horizontally to be parallel. Also, four of the first plate electrode parts 103 are disposed on the bottom surface of the first plate 101 to be electrically insulated and separated from one another in a first direction. Also, corresponding to the respective four first plate electrode parts 103, four of the second plate electrode parts 104 are disposed on the top surface of the second plate 102 to face the first plate electrode parts 103 one another. When inputting an electric signal, pairs of electrode parts facing one another independently perform physical movements.

As described with reference to FIG. 7, by applying the theory of embodying the flow of the vibration, as shown in FIG. 8, when the multi-operation points are sequentially operated to generate waveforms A, B, C, and D, as arrows shown in FIG. 8, a phenomenon like a vibration sequentially moves in a sequence of A-B-C-D may occur. When applying the film type actuator operating as the theory to electronic devices, various physical feels may be represented. For example, it is possible to represent and apply feels like a ball or a vehicle moves or crushes to games.

On the other hand, the first plate electrode parts 103 or the second plate electrode parts 104 may be formed of transparent electrodes capable of transmitting light. An available transparent electrode may be indium tin oxide (ITO). Since the ITO increases in price as a consumption amount of indium increases, economical feasibility thereof is rapidly decreased and a resistance increases due to a crack generated by bending. A transparent electrode using carbon nanotubes may be considered.

In the transparent electrode formed of the carbon nanotubes, most important properties are conductivity, transparency, and flexibility. The carbon nanotubes forming the transparent carbon nanotube electrode including may use one of single-walled carbon nanotubes, thin multi-walled carbon nanotubes, and multi-walled carbon nanotubes, and a mixture thereof as a material. The present invention is not limited thereto.

Particularly, the carbon nanotubes may have a mean length of 0.5 to 500 μm in bundle. Long carbon nanotubes on the market may be mechanically processed, for example, by ball-milling at a low temperature to form short carbon nanotubes to be used. In a view of reducing a contact resistance, the carbon nanotubes may have the mean length of 0.1 to 500 μm in bundle.

In the case of the transparent electrode in a film shape, carbon-nanotube power that is a raw material may be acid-treated and ultrasonic-treated and then may be formed to be a film. After forming the film by using the carbon nanotube powder, the film may be acid-treated and ultrasonic-treated. Also, the carbon nanotube powder that is a raw material may be acid-treated and ultrasonic-treated, may be formed to be a film, and may be acid-treated and ultrasonic-treated again. The acid treatment and the ultrasonic treatment may be performed separately but may be performed at the same to generate a defect.

Since the transparent carbon nanotube electrode has the flexibility, the transparent carbon nanotube electrode may be usefully applied to various display devices such as liquid crystal displays and organic light emitting display devices and solar cells. When using the flexible transparent electrode for the display device, the display device may be free to be bent, thereby increasing efficiency. In the case of the solar cell, when using the flexible transparent electrode, the solar cell may have various curved configurations according to a direction that the sun moves in such a way that light may be efficiently used and light efficiency may be improved.

When the transparent carbon nanotube electrodes are applied to various devices, thicknesses thereof may be properly controlled considering transparency. For example, since a transparent electrode may be formed with a thickness of from about 5 to about 500 nm, when the thickness of the transparent electrodes is more than 500 nm, the transparency may be decreased to deteriorate the light efficiency, and when the thickness is less than 5 nm, a sheet resistance may become too low or a film of carbon nanotubes may become uneven.

A method of manufacturing the transparent carbon nanotube electrode is as follows.

A carbon nanotube ink is formed by dispersing carbon nanotube powder in a solvent, a carbon nanotube film is obtained by applying the carbon nanotube ink onto a substrate, and a transparent electrode including carbon nanotubes with defects generated on surfaces is manufactured by acid-treating and ultrasonic-treating or acid/ultrasonic-treating the carbon nanotube film.

The acid treatment used by the manufacturing process is performed by soaking one of the carbon nanotube powder and carbon nanotube in one of acid solutions such as a nitric acid solution, a sulfuric acid solution, a hydrochloric acid solution, and a phosphoric acid solution, in which a level of defects on the surface of the carbon nanotube may be properly controlled by properly controlling the concentration of the acid solution or a soaking time.

A time for the acid treatment varies with the concentration of a used acid solution and a content of carbon nanotubes to be treated but may be performed for from about 1 minute to about 100 hours. When being out of the range of the time, the carbon nanotube may be broken or completely destructed due to an excessive amount of defects or conductivity may be not improved enough due to lack of defects. The acid treatment as described above may be performed by simply soaking but may be performed by stirring.

According to the present embodiment, a plurality of film type actuators is formed on one substrate in such a way that not only various haptic feedbacks but sounds may be generated. That is, when a user touches a display panel by using two or more fingers, a haptic feedback having different vibration numbers or strength may be provided. When the user touches a part between the actuators, a strong haptic feedback that is two times to maximum may be provided by overlapping vibrations generated by adjacent actuators. A new vibration feedback may be provided by overlapping different vibrations generated by the plurality of actuators, which is designated as the beat phenomenon. The haptic feedback as described above may transfer various sound by vibrations of the film type actuators.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A touch feedback actuator comprising:
   a first plurality of plate electrode parts including first and second plate electrode parts that are disposed coplanar on a first plate, the first and second plate electrode parts being spaced apart from each other, and the first plurality of plate electrode parts being electrically insulated from one another;
   a second plurality of plate electrode parts including third and fourth plate electrode parts that are disposed coplanar on a second plate, the third and fourth electrode parts being spaced apart from each other, the second plate being separate from the first plate, and the second plurality of plate electrode parts facing the first plurality of plate electrode parts, respectively, to form a plurality of directly opposing pairs of electrode parts, the plurality of pairs of electrode parts each having a space therebetween, and the plurality of pairs of electrode parts including first and second pairs of electrode parts, the first pair of electrode parts having the first and third plate electrode parts, the second pair of electrode parts having the second and fourth electrode parts; and
   a plurality of power supply units configured to respectively supply electric signals to the plurality of pairs of electrode parts to cause physical movements to independently occur in corresponding portions of the first plate and the second plate according to the electric signals input to the plurality of pairs of electrode parts, wherein the physical movements are generated in an area of the first plate when touched with a human body, thereby providing a local touch feedback for each of a plurality of movement areas;
   wherein a first one of the electrical signals and a resulting first physical movement in a first portion of the first plate over the first pair of electrode parts have a first frequency, and a second one of the electrical signals and a resulting second physical movement in a second portion of the first plate over the second pair of electrode parts have a second frequency, the first and second physical movements being superimposed and a difference in the first and second frequencies being sufficiently small to generate a beat wave at the first plate perceptible as a part of the local touch feedback.

2. The actuator of claim 1, wherein, when the first plate is an upper plate, and the second plate is a lower plate, and
   wherein the lower plate has a thickness that is substantially the same as or greater than a thickness of the upper plate, or the lower plate has a greater strength than a strength of the upper plate.

3. The actuator of claim 1, wherein the first and second plates and the first and second pluralities of plate electrode parts are formed of a substantially transparent material.

4. The actuator of claim 1, where in the first and second plates and the first and second pluralities of plate electrode parts are formed of a substantially flexible material.

5. The actuator of claim 1, wherein a movement amount of one of the first plate and the second plate is amplified by inputting the same electric signal to the plurality of pairs of electrode parts.

6. The actuator of claim 1, wherein an amplitude of a movement is generated by superposition of physical movements of one of the first plate and the second plate, or frequency properties cause a touch feedback or a sound playback by inputting different electric signals to the plurality of pairs of electrode parts.

7. The actuator of claim 1, wherein the first and second physical movements have the same amplitude.

8. The actuator of claim 1, wherein the plurality of pairs of electrode parts are configured to generate waveforms in a predetermined sequence to transfer a sense that a vibration occurs according to the sequence.

9. The actuator of claim 8, wherein each of the generated waveforms has an amplitude, the amplitude gradually increasing during a first time interval and gradually decreasing during a second time interval, consecutive ones of the generated waveforms having a specific time delay.

10. A touch feedback actuator comprising:
first and second plates having a thin-film shape, separate from each other by a distance and parallel to each other;
a first plurality of plate electrode parts including first and second plate electrodes that are disposed coplanar on one side of the first plate, the first and second plate electrode parts being spaced apart from each other, and the first plurality of plate electrode parts being electrically insulated from one another;
a second plurality of plate electrode parts including third and fourth plate electrode parts that are disposed coplanar on one side of the second plate, the third and fourth plate electrode parts being spaced apart from each other, and the second plurality of plate electrode parts facing the first plurality of plate electrode parts, respectively, to form a plurality of directly opposing pairs of electrode parts, the plurality of pairs of electrode parts each having a space without any solid layer being disposed therebetween, and the plurality of pairs of electrode parts including first and second pairs of electrode parts, the first pair of electrode parts having the first and third plate electrode parts, the second pair of electrode parts having the second and fourth electrode parts; and
a plurality of power supply units configured to respectively supply electric signals to the plurality of pairs of electrode parts to cause physical movements to independently occur in corresponding portions of the first plate and the second plate according to the electric signals input to the plurality of pairs of electrode parts, wherein the physical movements are generated in an area of the first plate when touched with a human body, thereby providing a local touch feedback for each of a plurality of movement areas;
wherein a first one of the electrical signals and a resulting first physical movement in a first portion of the first plate over the first pair of electrode parts have a first frequency, and a second one of the electrical signals and a resulting second physical movement in a second portion of the first plate over the second pair of electrode parts have a second frequency, the first and second physical movements being superimposed and a difference in the first and second frequencies being sufficiently small to generate a beat wave at the first plate perceptible as a part of the local touch feedback.

11. The actuator of claim 10, wherein the first and second pluralities of plate electrode parts are one of an application layer and an attachment layer that are formed of a conductive material forming a planar-polygonal shape.

12. The actuator of claim 10, further comprising a spacer formed of an elastic material, the spacer disposed on an edge part of the first plate and an edge part of the second plate and configured to provide a space between the first and second plates to prevent an occurrence of an electric short-circuit between the plurality of pairs of electrode parts during the physical movements.

13. The actuator of claim 11, wherein, when the first plate is an upper plate having 1 GPa or more of Young's modulus, the second plate is a lower plate thicker than the upper plate.

14. The actuator of claim 10, wherein the first and second plates and the first and second pluralities of plate electrode parts are formed of a substantially transparent material.

15. The actuator of claim 14, wherein the first and second plates and the first and second pluralities of plate electrode parts are formed of a substantially flexible material.

16. The actuator of claim 10, wherein a movement amount of one of the first plate and the second plate is amplified by inputting the same electric signal to the plurality of pairs of the electrode parts.

17. The actuator of claim 10, wherein the first and second physical movements have the same amplitude.

* * * * *